United States Patent
Baldemair et al.

(10) Patent No.: US 11,218,281 B2
(45) Date of Patent: Jan. 4, 2022

(54) RADIO NETWORK NODE, WIRELESS DEVICE AND METHODS PERFORMED THEREIN FOR HANDLING COMMUNICATION IN A WIRELESS COMMUNICATION NETWORK

(71) Applicant: Telefonaktiebolaget LM Ericsson (publ), Stockholm (SE)

(72) Inventors: Robert Baldemair, Solna (SE); Johan Bergman, Stockholm (SE); Erik Dahlman, Stockholm (SE); Olof Liberg, Stockholm (SE); Stefan Parkvall, Bromma (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 200 days.

(21) Appl. No.: 16/496,133

(22) PCT Filed: Mar. 23, 2018

(86) PCT No.: PCT/SE2018/050312
§ 371 (c)(1),
(2) Date: Sep. 20, 2019

(87) PCT Pub. No.: WO2018/174808
PCT Pub. Date: Sep. 27, 2018

(65) Prior Publication Data
US 2020/0028658 A1  Jan. 23, 2020

Related U.S. Application Data

(60) Provisional application No. 62/475,983, filed on Mar. 24, 2017.

(51) Int. Cl.
*H04L 5/00* (2006.01)
*H04L 5/14* (2006.01)
*H04L 5/26* (2006.01)

(52) U.S. Cl.
CPC .......... *H04L 5/0094* (2013.01); *H04L 5/1469* (2013.01); *H04L 5/26* (2013.01); *H04L 5/0005* (2013.01)

(58) Field of Classification Search
CPC ............. H04L 27/0006; H04L 27/2602; H04L 5/0005; H04L 5/0094; H04L 5/1469; H04L 5/26; H04W 16/14
See application file for complete search history.

(56) References Cited

U.S. PATENT DOCUMENTS

2012/0106499 A1  5/2012  Seo et al.
2012/0176923 A1  7/2012  Hsu et al.
(Continued)

FOREIGN PATENT DOCUMENTS

CN  101491012 A  7/2009
CN  101496316 A  7/2009
(Continued)

OTHER PUBLICATIONS

Unknown, Author, "3rd Generation Partnership Project; Technical Specification Group Radio Access Network Evolved Universal Terrestrial Radio Access (E-UTRA); Physical channels and modulation (Release 14)", 3GPP TS 36.211 V14.0.0, Sep. 2016, pp. 1-170.

(Continued)

*Primary Examiner* — Saad A. Waqas
(74) *Attorney, Agent, or Firm* — Murphy, Bilak & Homiller, PLLC

(57) ABSTRACT

Embodiments herein disclose e.g. a method performed by a wireless device (10) for handling communication for the
(Continued)

wireless device in a second wireless communication network. The second wireless communication network coexists with a first wireless communication network on a same bandwidth in frequency, wherein the first wireless communication network applies a first shift in frequency in uplink transmissions. The wireless device receives from a radio network node (12,13), an indication indicating application of a second shift in frequency to uplink transmissions in case the second wireless communication network uses Frequency Division Duplex (FDD). The wireless device further applies the second shift in frequency to uplink transmissions, wherein the second shift defines a shift in frequency to a subcarrier relative to a subcarrier grid of the second wireless communication network or a shift in frequency to the subcarrier grid of the second wireless communication network.

25 Claims, 9 Drawing Sheets

(56) References Cited

U.S. PATENT DOCUMENTS

| | | | | |
|---|---|---|---|---|
| 2014/0098761 | A1* | 4/2014 | Lee | H04W 24/02 370/329 |
| 2016/0205713 | A1* | 7/2016 | Seo | H04L 5/14 370/280 |
| 2018/0035416 | A1 | 2/2018 | Yi et al. | |
| 2019/0037565 | A1* | 1/2019 | Zheng | H04W 74/04 |

FOREIGN PATENT DOCUMENTS

| | | |
|---|---|---|
| CN | 105960760 A | 9/2016 |
| JP | 2011512089 A | 4/2011 |
| RU | 2528167 C2 | 9/2014 |
| RU | 2560101 C2 | 8/2015 |
| WO | 2009054644 A2 | 4/2009 |
| WO | 2016043557 A1 | 3/2016 |
| WO | 2017026594 A1 | 2/2017 |
| WO | 2018021676 A1 | 2/2018 |

OTHER PUBLICATIONS

Huawei, et al., "Coexistence between NR and LTE", 3GPP TSG RAN WG1 Meeting #87, R1-1611681, Reno, USA, Nov. 14-18, 2016, 1-6.

Huawei, et al., "Consideration of PRB misalignment between NR and LTE in the coexistence case", 3GPP TSG RAN WG1 NR Ad-Hoc Meeting, R1-1700030, Spokane, USA, Jan. 16-20, 2017, 1-3.

Huawei, et al., "Considerations of NR UL operation", 3GPP TSG RAN WG1 Meeting #88, R1-1701668, Athens, Greece, Feb. 13-17, 2017, 1-6.

Samsung, "LTE-NR Coexistence for UL", 3GPP TSG RAN WG1 Meeting #88, R1-1703011, Athens, Greece, Feb. 17, 2017, 1-8.

* cited by examiner

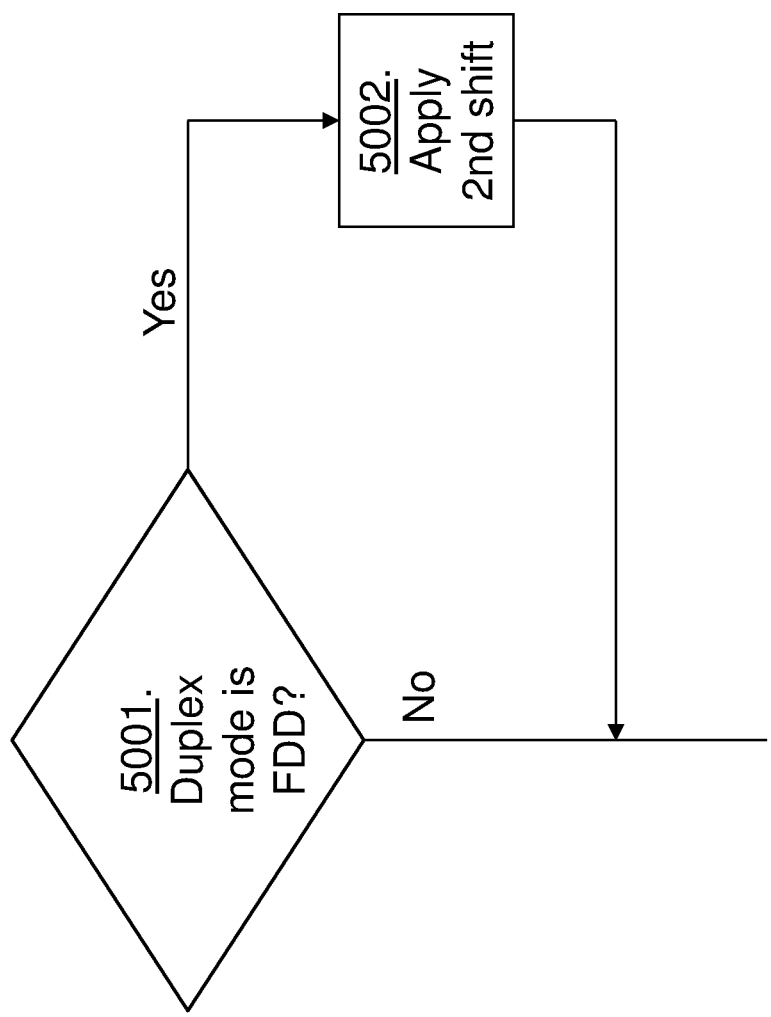

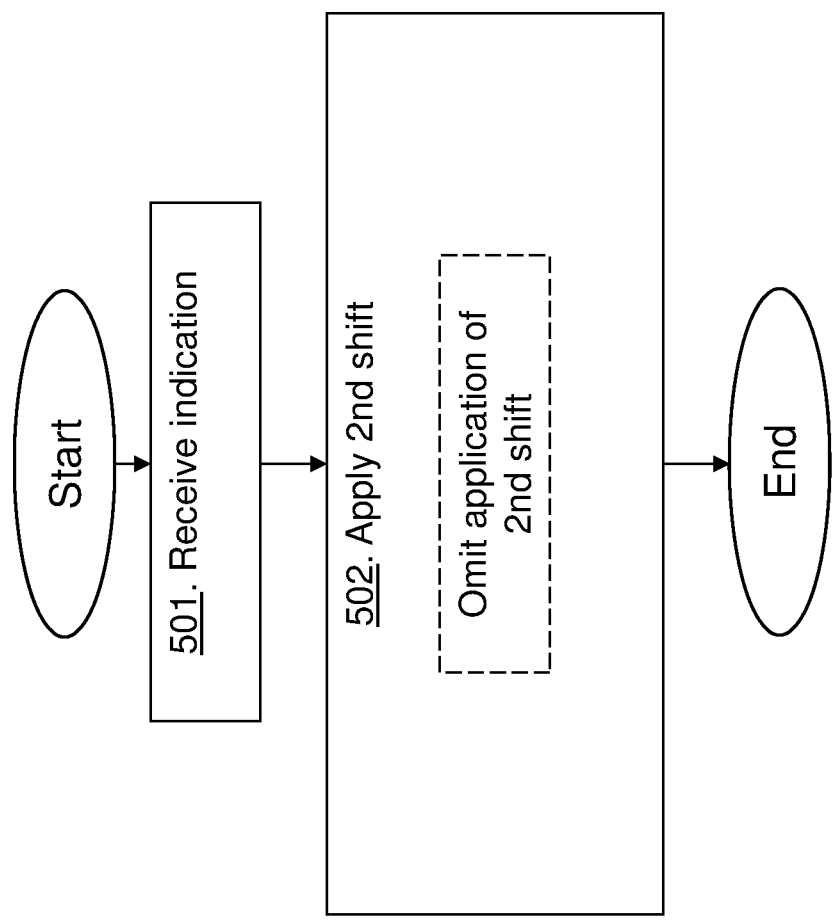

RADIO NETWORK NODE, WIRELESS DEVICE AND METHODS PERFORMED THEREIN FOR HANDLING COMMUNICATION IN A WIRELESS COMMUNICATION NETWORK

TECHNICAL FIELD

Embodiments herein relate to a radio network node, a wireless device and methods performed therein regarding wireless communication. Furthermore, a computer program and a computer-readable storage medium are also provided herein. In particular, embodiments herein relate to handling communication of the wireless device in a wireless communication network.

BACKGROUND

In a typical wireless communication network, wireless devices, also known as wireless communication devices, mobile stations, stations (STA) and/or user equipments (UE), communicate via a Radio access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a "NodeB" or "eNodeB". The service area or cell area is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks e.g. New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

LTE uplink (UL) is based on Discrete Fourier Transform Spread Orthogonal Frequency Division Multiplex (DFTS-OFDM). A DFTS-OFDM waveform has a lower Peak to Average Power Ratio (PAPR) than an OFDM waveform and has been adopted for LTE to reduce required power back-off of power amplifier and increase power amplifier efficiency.

In direct conversion receivers (most commonly used for wireless devices), local oscillator self-mixing, self-mixing of interference, and direct current (DC) because of transistor mismatch in the signal path lead to high non-wanted signal components at the local oscillator frequency, which is converted to DC in baseband. In LTE downlink (DL) an empty subcarrier overlapping DC (aka DC subcarrier) is introduced to avoid modulation of this subcarrier due its low modulation quality. For the uplink this solution is however not applicable since this would impair the low PAPR of the DFTS-OFDM waveform. Instead, LTE uplink applies ½ subcarrier shift (7.5 kHz) which places DC between two subcarriers.

Uplink in NR supports both OFDM and DFTS-OFDM. DFTS-OFDM has been introduced to support coverage limited wireless devices, due to its lower PAPR compared with OFDM waveform, and is limited to single-layer transmissions while in better Signal to Interference plus Noise Ratio (SINR) conditions OFDM is used which also supports multi-layer transmissions.

One considered scenario for NR is to enable coexistence of NR and LTE on a same bandwidth in frequency e.g. on an overlapping part of system bandwidths of the NR and LTE systems or coexist on at least one same frequency band of a system bandwidth. If NR, using 15 kHz numerology, and LTE would share the same subcarrier grid, NR and LTE can be deployed on the same frequency and unused LTE resource elements could be used for NR, given that all the required signaling is in place. With a difference of 7.5 kHz in the UL (since LTE applies a shift, and NR does not) this is not possible, NR and LTE would have to be separated in time or in frequency. NR and LTE could still share the same carrier bandwidth in frequency at the same time but a guard band is needed between the two radio access technologies (RAT), or transmissions of NR and LTE are multiplexed in time-domain but this solution is not resource efficient.

SUMMARY

An object of embodiments herein is to provide a mechanism implemented in a second wireless communication network to enable communication or to handle communication in a resource efficient manner. For example, the second wireless communication network may be deployed in an efficient manner in coexistence with a first wireless communication network.

According to an aspect the object is achieved by providing a method performed by a wireless device for handling communication for the wireless device in a second wireless communication network. The second wireless communication network coexists with a first wireless communication network on a same bandwidth in frequency, wherein the first wireless communication network applies a first shift in frequency in uplink transmissions. The wireless device receives from a radio network node, an indication indicating application of a second shift in frequency to uplink transmissions in case the second wireless communication network uses Frequency Division Duplex (FDD). The wireless device further applies the second shift in frequency to uplink transmissions, wherein the 25 second shift defines a shift in frequency to a subcarrier relative to a subcarrier grid of the second wireless communication network or a shift in frequency to the subcarrier grid of the second wireless communication network. The subcarrier grid may in some examples be an uplink subcarrier grid of the second wireless communication network.

According to another aspect the object is achieved by providing a method performed by a radio network node for enabling communication for a wireless device in a second wireless communication network. The second wireless communication network coexists with a first wireless communication network on a same bandwidth in frequency, wherein the first wireless communication network applies a first shift in frequency for uplink transmissions. The radio network node transmits to the wireless device, an indication indicating application of a second shift in frequency to uplink transmissions in case the second wireless communication network uses FDD, wherein the second shift defines a shift in frequency to a subcarrier relative to a subcarrier grid of the second wireless communication network, or a shift in frequency to the subcarrier grid of the second wireless communication network. The subcarrier grid may in some examples be an uplink subcarrier grid of the second wireless communication network.

It is herein also provided a computer program comprising instructions, which, when executed on at least one processor, causes the at least one processor to carry out the methods herein, as performed by the wireless device or the radio network node. Furthermore, it is herein provided a computer-readable storage medium, having stored thereon a computer program comprising instructions which, when executed on at least one processor, cause the at least one processor to carry out the methods herein, as performed by the wireless device or the radio network node.

According to yet another aspect the object is achieved by providing a wireless device for handling communication for the wireless device in a second wireless communication network. The second wireless communication network is configured to coexist with a first wireless communication network on a same bandwidth in frequency, wherein the first wireless communication network is configured to apply a first shift in frequency in uplink transmissions. The wireless device is configured to receive from a radio network node, an indication indicating application of a second shift in frequency to uplink transmissions in case the second wireless communication network uses FDD. The wireless device is further configured to apply the second shift in frequency to uplink transmissions, wherein the second shift defines a shift in frequency to a subcarrier relative to a subcarrier grid of the second wireless communication network or a shift in frequency to the subcarrier grid of the second wireless communication network. The subcarrier grid may in some examples be an uplink subcarrier grid of the second wireless communication network.

According to still another aspect the object is achieved by providing a radio network node for enabling communication for a wireless device in a second wireless communication network, wherein the second wireless communication network is configured to coexist with a first wireless communication network on a same bandwidth in frequency. The first wireless communication network is configured to apply a first shift in frequency for uplink transmissions. The radio network node is configured to transmit to the wireless device, an indication indicating application of a second shift in frequency to uplink transmissions in case the second wireless communication network uses FDD, wherein the second shift defines a shift in frequency to a subcarrier relative to a subcarrier grid of the second wireless communication network, or a shift in frequency to the subcarrier grid of the second wireless communication network. The subcarrier grid may in some examples be an uplink subcarrier grid of the second wireless communication network.

For FDD cross-link interference is no concern since uplink and downlink have their own spectrum, i.e. transmissions in UL and DL are performed over different frequencies. Therefore, it is proposed to shift the UL transmissions so that subcarriers or subcarrier grids of the different wireless communication networks are aligned. This shift can either be done in baseband, which is less preferred since in this case the low modulation quality of the DC frequency is spread over several subcarriers, or by adjusting a duplex distance between NR downlink and uplink by e.g. ½ subcarrier, such as 7.5 kHz, relative to the LTE duplex distance used in an operating band.

Embodiments herein enable good, resource-element wise, coexistence between the second wireless communication network, such as NR using 15 kHz wide subcarriers, and the first wireless communication network, such as LTE, on a same bandwidth in frequency, which may in some examples be a same carrier bandwidth, without impact on UL performance, especially if uplink shift is achieved by adjusting the duplex distance, for FDD. Thus, embodiments herein provide a resource efficient solution.

For TDD, several disadvantages of e.g. ½ subcarrier shift exist such as difficult cross-link interference cancellation, and low modulation quality of DC subcarrier spreads out over several tones. For TDD an UL shift would thus complicate cross-link interference cancellation and would either lead to spreading of low modulation quality of DC frequency to multiple subcarriers or to that usage of two local oscillators would be required, both being severe disadvantages. Therefore, some embodiments herein propose not to shift the uplink transmission in frequency relative to the downlink, which means that in this such embodiments downlink and uplink share the same carrier frequency, and that the second shift is neither implemented in the baseband. In other words, some embodiments herein avoid these disadvantages by omitting the application of the second shift when using TDD at the cost that UL coexistence of different networks such as NR and LTE is achieved via a guard band or time-domain multiplexing.

Embodiments herein show that the second wireless communication network may be deployed in coexistence with a first wireless communication network in an efficient manner.

BRIEF DESCRIPTION OF THE DRAWINGS

Embodiments will now be described in more detail in relation to the enclosed drawings, in which:

FIG. 5a is a schematic flowchart according to embodiments herein;

FIG. 5b is a schematic flowchart depicting a method performed by a wireless device according to embodiments herein;

DETAILED DESCRIPTION

Figure 1:
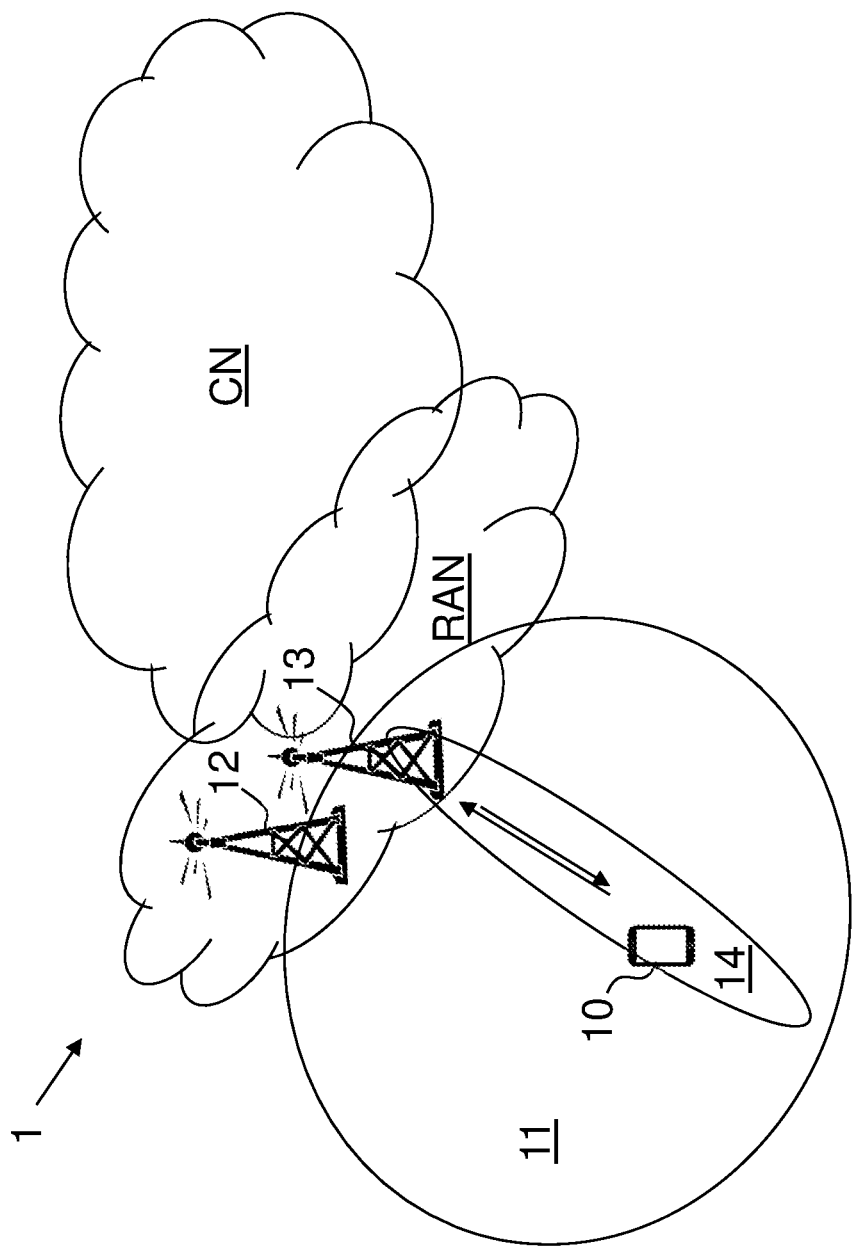
FIG. 1 shows a schematic overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use one or a number of different technologies, such as New Radio (NR), Wi-Fi, LTE, LTE-Advanced, Fifth Generation (5G), Wideband Code-Division Multiple Access (WCDMA), Global System for Mobile communications/ enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a radio network node within an area served by the radio network node.

The wireless communication network 1 comprises a first radio network node 12 providing radio coverage over a geographical area, a first service area 11 or a first beam, of a first radio access technology (RAT) or first wireless communication network, such as LTE, Wi-Fi, WiMAX or similar. The first wireless communication network may be a wideband network. The first radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a gNodeB, a base transceiver station, a radio remote unit, an Access Point Base Station, a base station router, a transmission arrangement of a radio base station, a stand-alone access point or any other network unit or node capable of communicating with a wireless device within the service area served by the first radio network node 12 depending e.g. on the first radio access technology and terminology used. The first radio network node 12 may be referred to as a serving network node wherein the first service area may be referred to as a serving beam, and the serving network node serves and communicates with the wireless device 10 in form of DL transmissions to the wireless device 10 and UL transmissions from the wireless device 10.

A second radio network node 13 may further provide radio coverage over a second service area 14 or a second beam of a second radio access technology (RAT) or second wireless communication network, such as NR, LTE, Wi-Fi, WiMAX or similar. The second wireless communication network may be a narrowband network. The first RAT and the second RAT may be the same or different RATs. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a gNodeB, a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used.

According to embodiments herein the first wireless communication network, such as the LTE network, is configured to apply a first shift in frequency to subcarriers for uplink transmissions from one or more wireless devices e.g. relative to a grid of subcarriers, also referred to as subcarrier grid, used for DL transmissions. To enable resource-element wise coexistence with the first wireless communication network uplink transmissions in the second wireless communication network, such as a NR network using a 15 kHz subcarrier bandwidth, are shifted in frequency. The resource-element wise coexistence of the first and second wireless communication networks may occur on a same bandwidth in frequency. The same bandwidth in frequency may for example be an overlapping part of system bandwidths of the first and second wireless communication networks, or the first and second wireless communication networks may coexist on at least one same frequency band of a system bandwidth. In some embodiments, the same bandwidth in frequency may be a same carrier bandwidth of the first and second wireless communication networks.

Embodiments herein thus disclose that the wireless device 10 applies a second shift in frequency by shifting its subcarriers for uplink transmissions, e.g. by ½ subcarrier, relative to a subcarrier grid of the second wireless communication network or by shifting the subcarrier grid of the second wireless communication network, such as the NR network, so that subcarriers of the different wireless communication networks are aligned. The subcarrier grid may in some examples be an uplink subcarrier grid of the second wireless communication network.

This is performed for UL transmissions for wireless devices when the second wireless communication network is configured for or uses Frequency Division Duplex (FDD) for UL communication. The second shift in frequency may correspond to the first shift in frequency used for the first wireless communication network, i.e. it may be a same shift in frequency as the first shift. This application of the second shift may either be done in baseband, less preferred since in this case the low modulation quality of the DC frequency is spread over several subcarriers, or by adjusting a duplex distance between second wireless communication network downlink grid and uplink grid by ½ subcarrier relative to the duplex distance used in an operating band.

Figure 2:
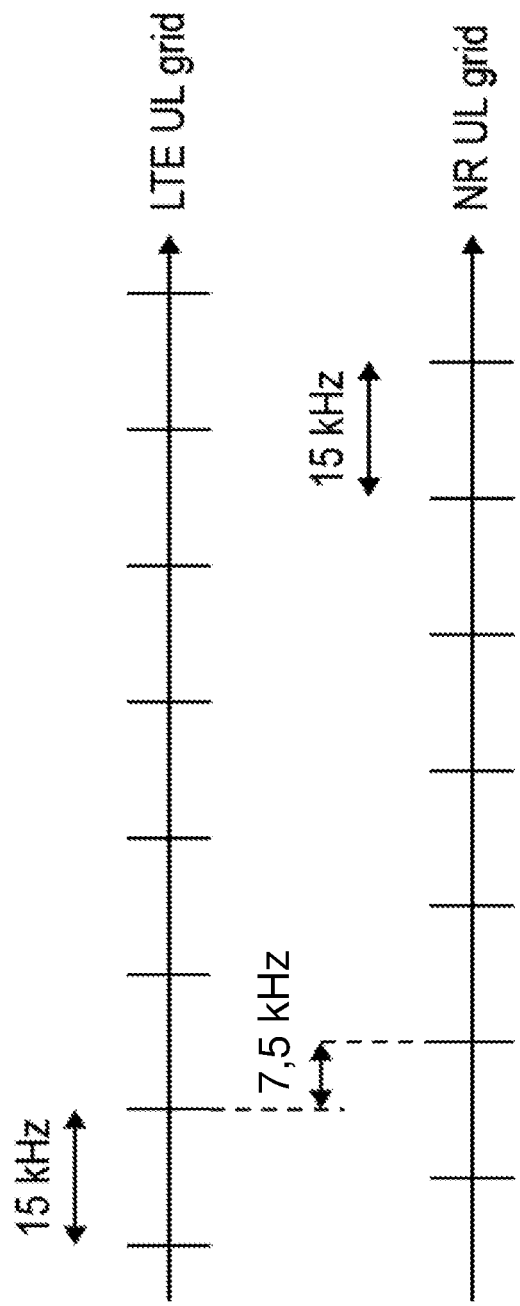
FIG. 2 NR and LTE UL subcarrier grids are not aligned. NR subcarrier grid of 15 kHz is shown.

Applying a shift, such as ½ subcarrier shift in the second wireless communication network, e.g. an NR network, is acceptable for DFTS-OFDM but may be disadvantageous for OFDM since the low modulation quality of the DC frequency would not be limited to a single subcarrier but spread across multiple subcarriers, due to the sinc-transfer function of each OFDM tone. The second shift may therefore, according to some embodiments, be selectively applied depending on if DFTS-OFDM is used or not for an uplink transmission in the second wireless communication network. In some embodiments, to enable the second wireless communication network, such as NR using 15 kHz width of subcarrier, coexistence on the same carrier bandwidth as the first wireless communication network on a per resource element wise granularity, the second wireless communication network, exemplified by an NR network, and the first wireless communication network, exemplified by an LTE may share the same subcarrier grid. For NR and LTE, this is fulfilled for downlink but LTE applies e.g. a 7.5 kHz or ½ subcarrier shift in uplink which leads to non-aligned subcarrier grids if NR does not apply such a shift, see FIG. 2.

Figure 3:
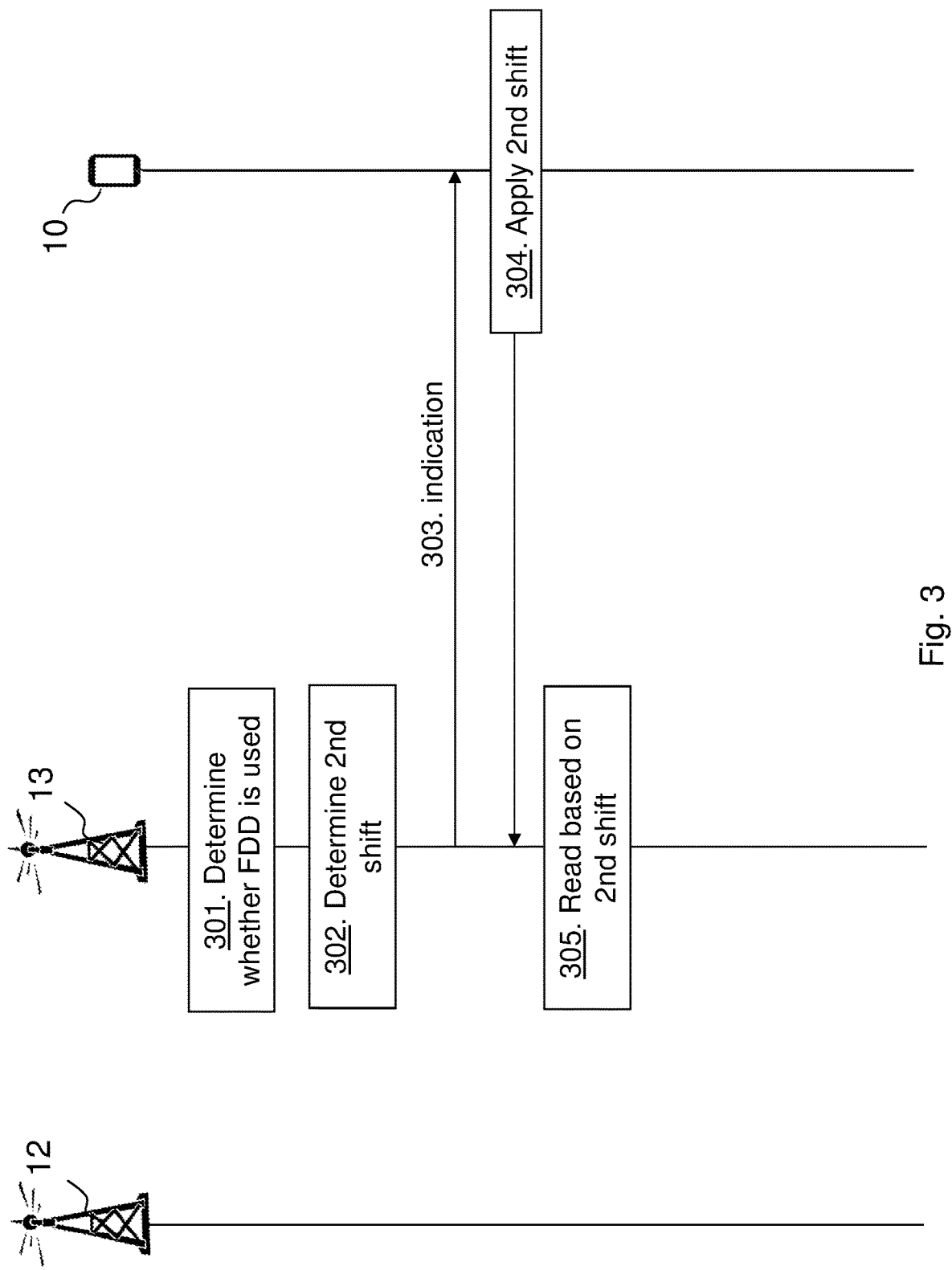
FIG. 3 is a schematic combined flowchart and signaling scheme according to embodiments herein.

FIG. 3 is a schematic combined flowchart and signaling scheme depicting some embodiments herein. The first wireless communication network, such as the LTE network, is configured to apply the first shift in frequency to subcarriers for uplink transmissions from one or more wireless devices. It should be noted that the embodiments herein cover the cases: when the first wireless communication network is present, and also if no first wireless communication network is present. Thus, the second shift may be applied for FDD always while not for TDD, even if there is no other wireless communication network for coexistence.

Action 301. The second radio network node 13 may determine that the second wireless communication network, such as the NR network, uses FDD for transmissions to and/or for receptions from wireless devices. For example, the second radio network node 13 may determine whether the second wireless communication network (e.g. NR) uses FDD or TDD e.g. for transmissions to and receptions from wireless devices.

Action 302. When determined that the second wireless communication network uses FDD, the second radio network node 13 determines the second shift in frequency of uplink transmissions from the wireless device. The second shift in frequency is a shift to a subcarrier relative to the subcarrier grid, for the second wireless communication network, for uplink transmission, or the second shift is a shift in frequency to the subcarrier grid for the second wireless communication network, for uplink transmission. The second shift may correspond to the first shift used for the first wireless communication network. For example, the second shift may be ½ subcarrier shift thereby aligning the subcarrier grids, aka grids of subcarriers, for the first wireless communication network and the second wireless communication network. In the case where the second wireless communication network is the only wireless communication network present, the second radio network node 13 may decide just based on FDD to implement the second shift (either via shifted duplex distance or do a shift in the baseband). Shift to the subcarrier grids means the duplex distance shift, i.e. the shift to the subcarrier grid obtained by adjusting the duplex distance, while shift to subcarriers relative the subcarrier grid means the shift in baseband.

Action 303. The second radio network node 13 may configure the wireless device 10 with the determined second shift for UL transmissions. The second radio network node 13 may e.g. transmit an indication ordering the wireless device 10 to apply the second shift to uplink transmissions or not. The indication may be an index in a table or a value, in frequency, of the second shift.

Action 304. The wireless device 10 applies the second shift to e.g. the subcarrier grid, e.g. as a shift relative to the duplex distance, or as a shift to subcarriers relative to the subcarrier grid, e.g. as a shift in the base band, for communicating in the second wireless communication network using FDD i.e. using different frequencies in DL and UL transmissions.

Action 305. The second radio network node 13 may then receive and read or decode transmission from the wireless device 10 related to or applying the shifted subcarrier grid, or subcarriers shifted relative to the subcarrier grid. That is, the second radio network node 13 may use the second shift to read or decode the UL transmission from the wireless device 10, and/or may read or decode the UL transmission based on the second shift.

For FDD the second shift may be implemented in two ways, taking coexistence between LTE and NR as an example: The UL is shifted by ½ subcarrier in baseband as in LTE or the duplex distance of NR is adjusted by e.g. 7.5 kHz (½ subcarrier) relative to the duplex distance of LTE deployed in this operating band.

½ Subcarrier Baseband Shift

The second shift may be described as the shift in the LTE spec 36.211 v.14.0.0 is described by $$S_l^{(p)}(t) = \sum_{k=-\lfloor N_{RB}^{UL} N_{sc}^{RB}/2 \rfloor}^{\lceil N_{RB}^{UL} N_{sc}^{RB}/2 \rceil - 1} a_{k(-),l}^{(p)} \cdot e^{j2\pi(k+1/2)\Delta f(t-N_{CP,l}T_s)}$$

with:

$N_{RB}^{UL}$ number of PRB in uplink $N_{sc}^{RB}$ subcarriers per PRB a complex modulation symbol $\Delta f$ subcarrier spacing $N_{CP}$ length of cyclic prefix in samples $T_s$ time duration of one sample (chip rate)

Figure 4A:
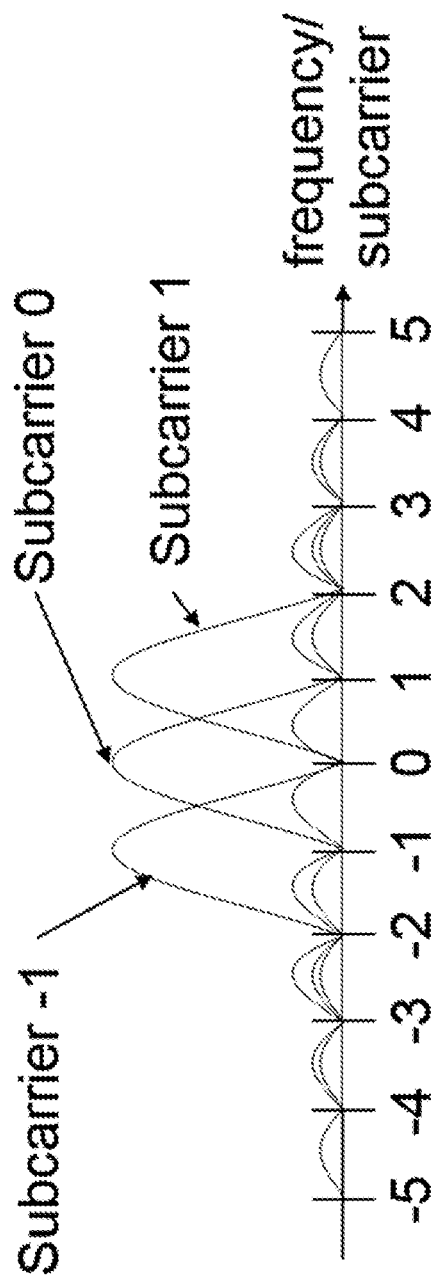
FIGS. 4a-4b shows shifted and not shifted grids of subcarriers.
Figure 4B:
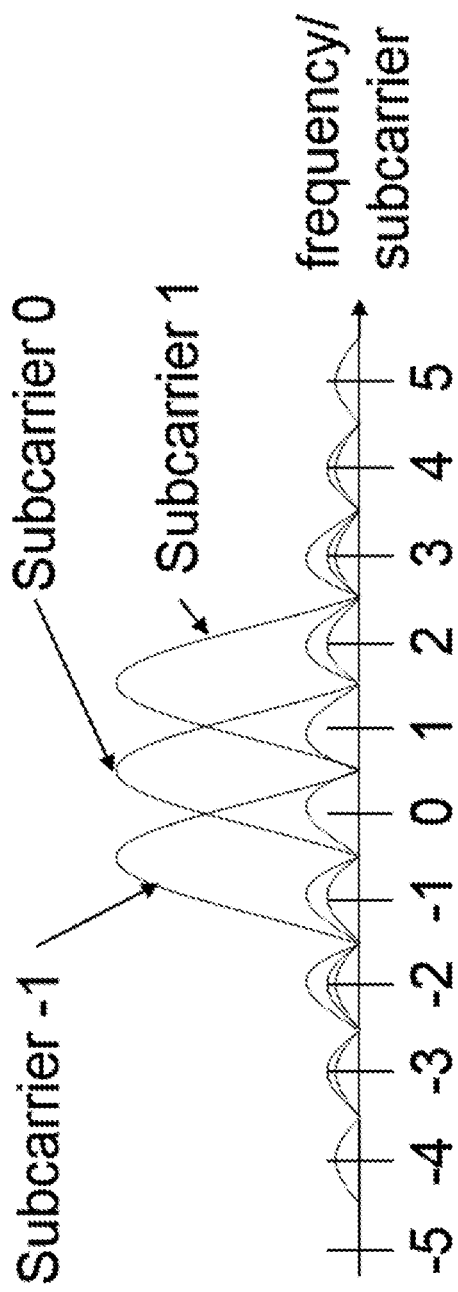

The expression $(k+½)\Delta f$ (the ½ part) implements the ½ subcarrier shift in baseband. This may be done for the second wireless communication network such as the NR. In an OFDM system each subcarrier has a sinc-like subcarrier-transfer function. FIG. 4a shows an example wherein no shift is applied and the DC frequency (0) coincides with subcarrier 0 of the subcarrier grid. FIG. 4b shows embodiments with ½ subcarrier shift implemented in baseband so that the DC frequency (0) is between two subcarriers. The sinc-like functions indicate the subcarrier transfer function. If DC frequency coincides with a subcarrier (i.e. no shift is applied, see FIG. 4a) the low modulation quality of DC frequency (0) is mainly limited to single tone (subcarrier 0) (since DC frequency falls on top of zeros of sinc-like function of neighbor subcarriers). With a shift DC frequency (0) that falls in-between two subcarriers (see FIG. 4b) and the low modulation quality impairs multiple subcarriers. Especially for OFDM it is preferable that the low modulation quality of DC frequency is limited to a single subcarrier rather than spread over multiple subcarriers. Therefore, implementing the second shift as a DC subcarrier shift in baseband is not the preferred solution but certainly one possibility.

Adjusting Duplex Distance

In the first wireless communication network such as the LTE the duplex distance between uplink and downlink may have a default band-specific value or the duplex distance may be signaled as part of system information. In both cases the duplex distance is always a multiple of 100 kHz, separation of uplink and downlink center frequency.

To achieve alignment between downlink and uplink subcarrier grid one possibility is to adjust a duplex distance of the second wireless communication network with the second shift, e.g. the NR duplex distance would be n·100+7.5 kHz or n·100−7.5 kHz.

This second shift may either be fixed, i.e. the duplex distance for the second wireless communication network may always, at least for bands defined for the first wireless communication network, follow above formulas. Alternatively, the duplex distance may be configured for the second wireless communication network and at least one possible configuration value, for NR, may be n·100+7.5 kHz or n·100−7.5 kHz.

An alternative formulation is to have an offset to the duplex distance for the second wireless communication network. The duplex distance in a given band would e.g. follow the LTE values. On top of the duplex value NR would have an offset of 7.5 kHz or −7.5 kHz. This offset being an example of the second shift may either be fixed e.g. in the spec or configurable.

The shift value of 7.5 kHz of NR is based on that the NR numerology is 15 kHz. If the NR carrier does not operate with 15 kHz there is no need to adjust the duplex distance by 7.5 kHz. If an NR carrier operate with 15 kHz and another numerology it could however make sense to apply a shift of 7.5 kHz even for the other numerology. Numerology herein covering e.g. width of subcarrier and similar.

For TDD an UL shift could either be realized using the baseband shift methodology or using two local oscillators, one for each direction which are offset by 7.5 kHz. As outlined in the previous section (see FIG. 4b) for OFDM the baseband shift has disadvantages since the low modulation quality of DC frequency spreads across multiple subcarriers. An alternative solution would be to use two local oscillators, however, this increases wireless device power consumption and is not preferred either.

NR supports TDD and also dynamic TDD where link directions can be dynamically selected. Especially in dynamic TDD cross-link interference, i.e. downlink to uplink interference and vice versa, can occur and its cancellation can be beneficial. Such cancellation is hugely simplified if both uplink and downlink share a common subcarrier grid. This is yet another reason in NR TDD not to apply ½ subcarrier shift.

Applying e.g. ½ subcarrier shift to NR uplink is therefore not straight forward. Without ½ subcarrier shift the resource-element wise coexistence between NR using 15 kHz and LTE is not possible in the UL; NR and LTE could still share the same bandwidth in frequency e.g. same carrier bandwidth in frequency using a guard band, or NR and LTE could be multiplexed in time-domain, but such a solution is not resource efficient.

For TDD none of the solutions provide sufficient benefits, and it is therefore proposed not to implement a shift for TDD. Thus, embodiments herein relate to, for the second wireless communication network using FDD, implementing the second shift of e.g. ½ subcarrier, e.g. by adjusting the duplex distance, e.g. including the formulation of duplex distance n·100∓7.5 kHz, via an offset of 7.5 kHz, fixed or configurable. Alternatively, the second shift can be realized in baseband as disclosed herein.

A flowchart describing some embodiments herein is shown in FIG. 5a.

Action 5001. Determine whether the second wireless communication network uses FDD or TDD, e.g. determined at the second radio network node 13 and/or the wireless device 10.

Action 5002. In case FDD is used, apply the second shift to UL transmissions. For TDD, no second shift is implemented.

In case TDD is used no shift is used and a guard band is used to separate the first and second wireless communication networks. Thus, the wireless device 10 applies the second shift in frequency to uplink transmissions in case the second wireless communication network uses FDD. The wireless device may omit applying the second shift in frequency to uplink transmissions in case the second wireless communication network uses TDD.

Whether the second wireless communication network uses FDD may be a decision criterion. The second radio network node 13 may then not need to signal anything to the wireless device 10, since the wireless device 10 knows from the operating band if this second wireless communication network uses FDD.

The method actions performed by the wireless device 10 for handling communication for the wireless device in the second wireless communication network according to some embodiments will now be described with reference to a flowchart depicted in FIG. 5b. The actions do not have to be taken in the order stated below, but may be taken in any suitable order. Actions performed in some, but not necessarily all embodiments are marked with dashed boxes. The second wireless communication network coexists with the first wireless communication network on the same bandwidth in frequency. The first wireless communication network applies the first shift in frequency for uplink transmissions.

Action 501. The wireless device 10 receives from the radio network node, the indication indicating application, or use, of the second shift in frequency to uplink transmissions in case the second wireless communication network uses FDD.

Action 502. The wireless device 10 further applies the second shift in frequency to uplink transmissions, wherein the second shift defines the shift in frequency to a subcarrier relative to a subcarrier grid of the second wireless communication network or a shift in frequency to the subcarrier grid of the second wireless communication network. The subcarrier grid may in some examples be an uplink subcarrier grid of the second wireless communication network.

The wireless device 10 may further omit applying the second shift in frequency to uplink transmissions in case the second wireless communication network uses TDD. The second shift may correspond to the first shift used by the first wireless communication network. The indication may indicate to omit applying the second shift to uplink transmissions, e.g. the indication may indicate a zero as the second shift.

Figure 5C:
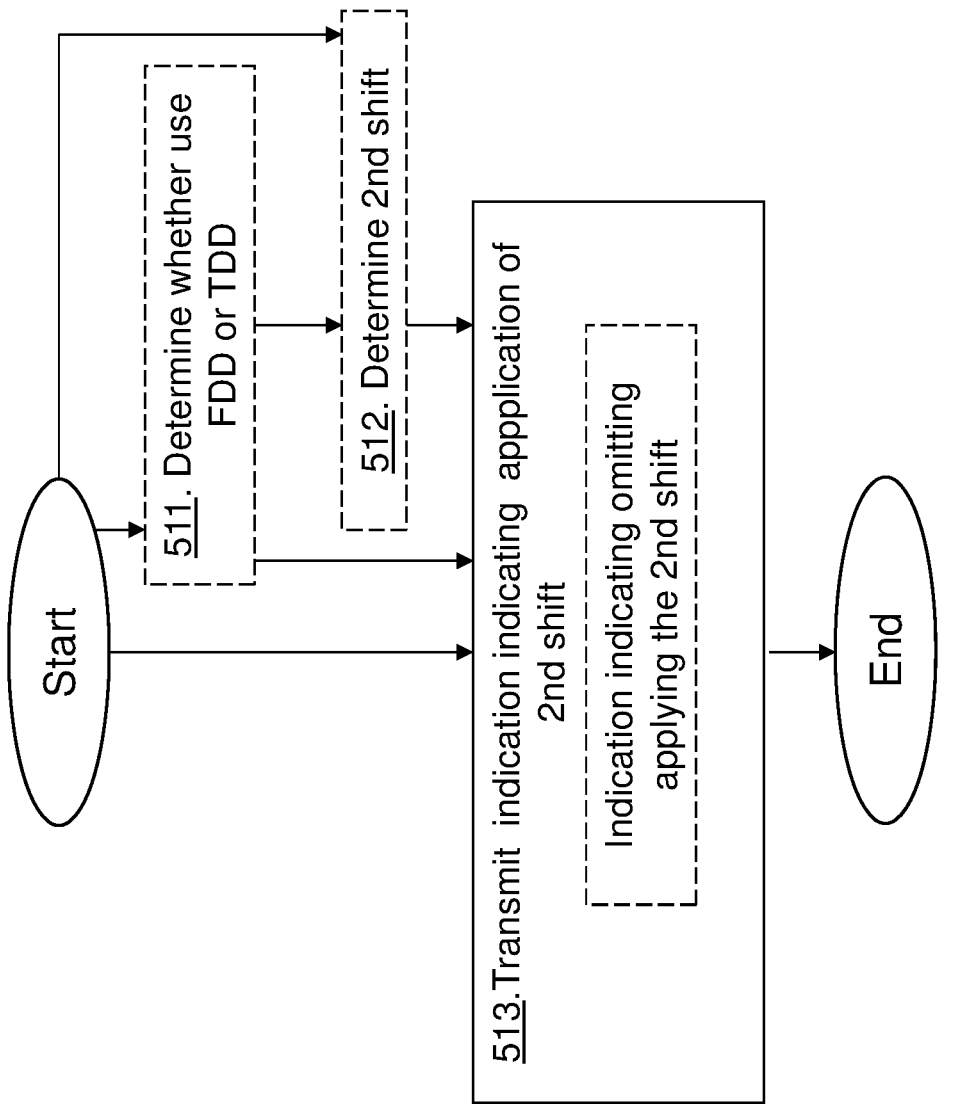
FIG. 5c is a schematic flowchart depicting a method performed by a radio network node according to embodiments herein.

The method actions performed by the radio network node, such as the second radio network node 13, for enabling communication for the wireless device 10 in the second wireless communication network according to some embodiments will now be described with reference to a flowchart depicted in FIG. 5c. The actions do not have to be taken in the order stated below, but may be taken in any suitable order. Actions performed in some, but not necessarily all embodiments are marked with dashed boxes. The second wireless communication network coexists with the first wireless communication network on the same bandwidth in frequency. The first wireless communication network applies the first shift in frequency for uplink transmissions.

Action 511. The radio network node may determine whether the second wireless communication network uses FDD, or time division duplex, TDD.

Action 512. The radio network node may determine the second shift. E.g. the radio network node may determine the second shift to align the subcarrier grids for the first wireless communication network and the second wireless communication network, or to align subcarriers of the second wireless communication network and the first wireless communication network. The subcarrier grids may in some examples be uplink subcarrier grids of the first and second wireless communication network.

Action 513. The radio network node transmits to the wireless device 10, the indication indicating application of the second shift in frequency to uplink transmissions in case the second wireless communication network uses FDD. The second shift defines a shift in frequency to a subcarrier relative to a subcarrier grid of the second wireless communication network, or a shift in frequency to the subcarrier grid of the second wireless communication network. The indication may indicate to omit applying the second shift to uplink transmissions. The second shift may correspond to the first shift used by the first wireless communication network. The indication may be transmitted when it is determined that FDD is used and no indication may be transmitted when it is determined that TDD is used.

Figure 6:
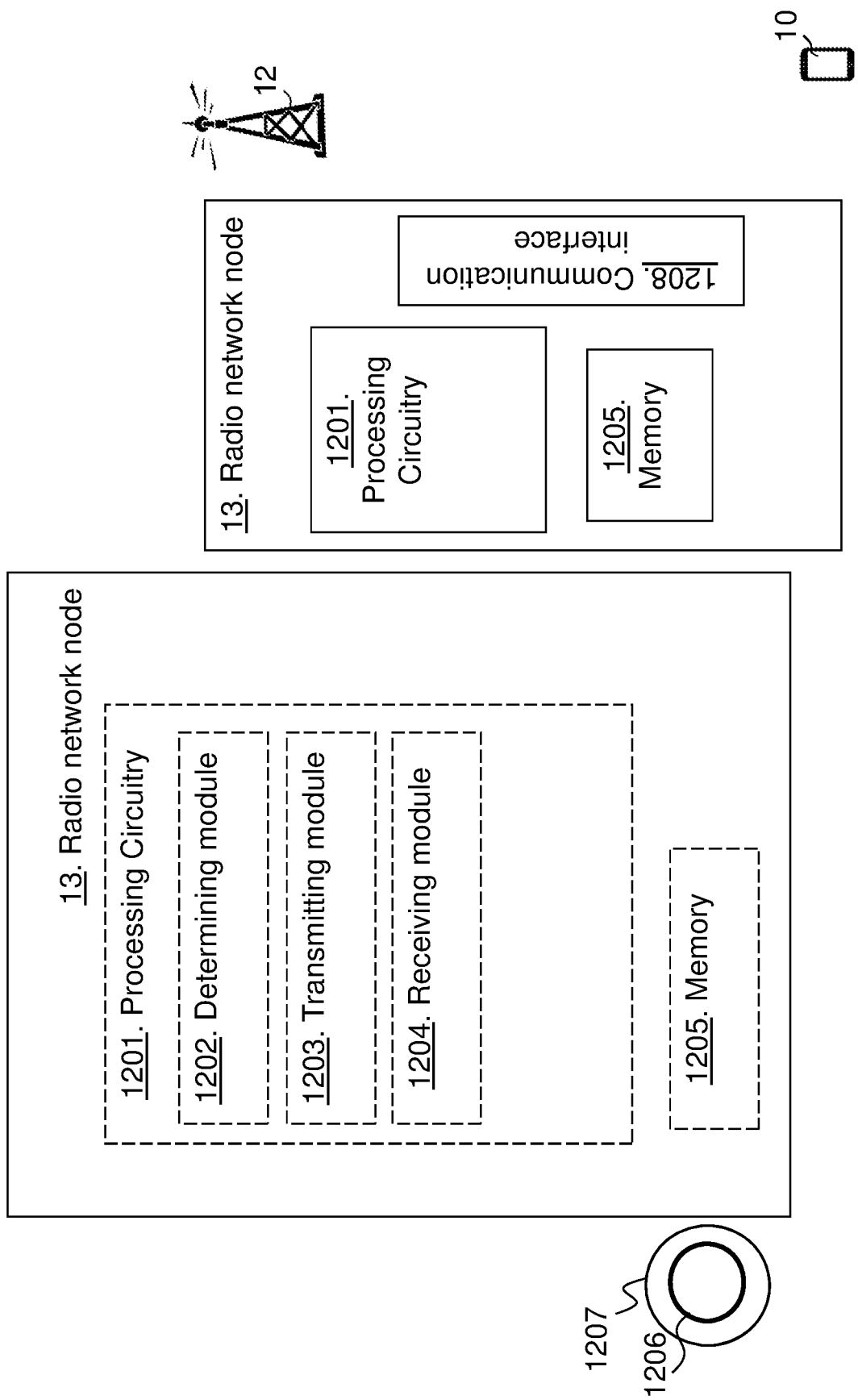
FIG. 6 is a block diagram depicting a radio network node according to embodiments herein.

FIG. 6 is a block diagram depicting, in two embodiments, the radio network node such as the second radio network node 13 according to embodiments herein for enabling communication for the wireless device 10 in the second wireless communication network. The second wireless communication network is configured to coexist with the first wireless communication network on the same bandwidth in frequency, wherein the first wireless communication network is configured to apply the first shift in frequency for uplink transmissions.

The second radio network node 13 may comprise processing circuitry 1201, e.g. one or more processors, configured to perform the methods herein.

The second radio network node 13 may comprise a determining module 1202. The second radio network node 13, the processing circuitry 1201, and/or the determining module 1202 may be configured to determine whether the second wireless communication network uses frequency division duplex (FDD) or time division duplex, (TDD). The second radio network node 13, the processing circuitry 1201, and/or the determining module 1202 may be configured to determine whether the second wireless communication network uses FDD or not. The second radio network node 13, the processing circuitry 1201, and/or the determining module 1202 may be configured to determine the second shift. The second shift may be determined to align the subcarrier grids for the first wireless communication network and the second wireless communication network, or to align subcarriers of the second wireless communication network and the first wireless communication network.

The second radio network node 13 may comprise a transmitting module 1203, e.g. transmitter or transceiver. The second radio network node 13, the processing circuitry 1201, and/or transmitter and/or the transmitting module 1203 is configured to transmit to the wireless device 10, the indication indicating application of the second shift in frequency to uplink transmissions in case the second wireless communication network uses FDD. The second shift defines the shift in frequency to a subcarrier relative to a subcarrier grid of the second wireless communication network, or a shift in frequency to the subcarrier grid of the second wireless communication network. E.g. the second radio network node 13, the processing circuitry 1201, and/or transmitter and/or the transmitting module 1203 may be adapted to configure the wireless device with an indication ordering the wireless device 10 to apply the second shift for UL transmissions. E.g. apply the 35 second shift to the subcarrier grid, also denoted a second subcarrier grid for UL transmissions, or apply the second shift on subcarriers relative to the second subcarrier grid for UL transmissions. The indication may indicate to omit applying the second shift to uplink transmissions, e.g. shift is zero. The second shift may correspond to the first shift used by the first wireless communication network. The second radio network node 13, the processing circuitry 1201, and/or transmitter and/or the transmitting module 1203 is configured to transmit the indication when it is determined that FDD is used, and to transmit no indication when it is determined that TDD is used.

The second radio network node 13 may comprise a receiving module 1204, e.g. receiver or transceiver. The second radio network node 13, the processing circuitry 1201, and/or the receiver and/or the receiving module 1204 may be configured to receive UL transmission on a subcarrier related to or taking the second shift into account.

The second radio network node 13 further comprises a memory 1205. The memory comprises one or more units to be used to store data on, such as set of shifts, subcarrier grids, scheduling information, duplex information, indices, applications to perform the methods disclosed herein when being executed, and similar. The second radio network node 13 may comprise a communication interface 1208 such as a transmitter, a receiver, a transceiver and/or one or more antennas.

The methods according to the embodiments described herein for the second radio network node 13 are respectively implemented by means of e.g. a computer program 1206 or a computer program product, comprising instructions, i.e., software code portions, which, when executed on at least one processor, cause the at least one processor to carry out the actions described herein, as performed by the second radio network node 13. The computer program 1206 may be stored on a computer-readable storage medium 1207, e.g. a disc, a universal serial bus (USB) stick, memory or similar. The computer-readable storage medium 1207, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium or a transitory computer-readable storage medium. Thus, the radio network node may comprise the processing circuitry and the memory, said memory comprising instructions executable by said processing circuitry whereby said radio network node is operative to perform the methods herein.

Figure 7:
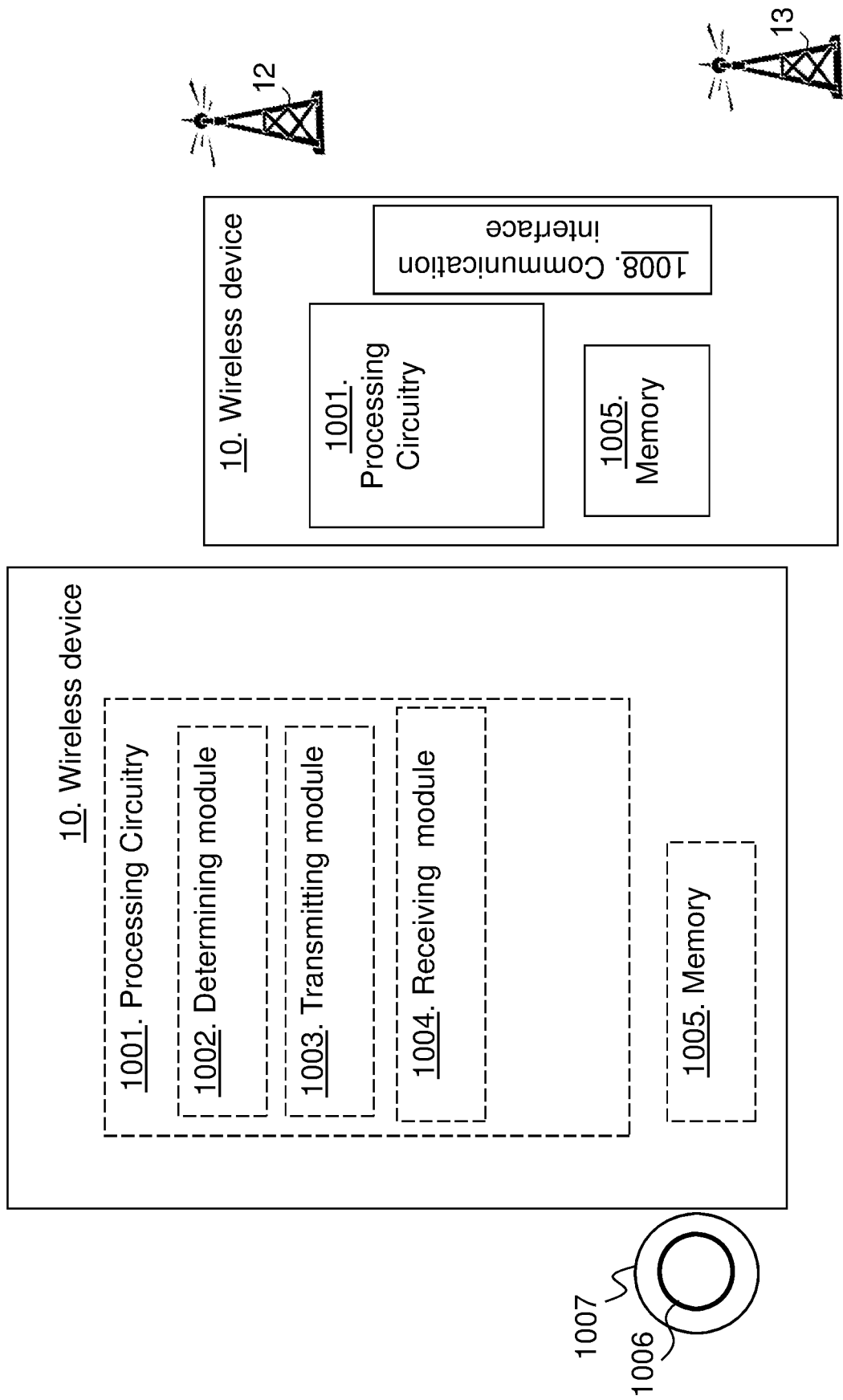
FIG. 7 is a block diagram depicting a wireless device according to embodiments herein.

FIG. 7 is a block diagram depicting, in two embodiments, the wireless device 10 according to embodiments herein for handling communication for the wireless device 10 in the second wireless communication network. The second wireless communication network is configured to coexist with the first wireless communication network on the same bandwidth in frequency, wherein the first wireless communication network is configured to apply the first shift in frequency in uplink transmissions.

The wireless device 10 may comprise processing circuitry 1001, e.g. one or more processors, configured to perform the methods herein.

The wireless device 10 may comprise a determining module 1002. The wireless device 10, the processing circuitry 1001, and/or the determining module 1002 may be configured to determine whether FDD is used or not (or TDD is used) by the second wireless communication network.

The wireless device 10 may comprise a receiving module 1004, e.g. receiver or transceiver. The wireless device 10, the processing circuitry 1001, and/or the receiving module 1004 is configured to receive from the radio network node, the indication indicating application of the second shift in frequency to uplink transmissions in case the second wireless communication network uses FDD. E.g. the wireless device 10, the processing circuitry 1001, and/or the receiving module 1004 may be configured to receive the indication ordering the wireless device 10 to apply the second shift for UL transmissions. E.g. apply the second shift to the subcarrier grid, also denoted the second subcarrier grid for UL transmissions, or apply the second shift on subcarriers relative to the second subcarrier grid for UL transmissions. The indication may indicate to omit applying the second shift to uplink transmissions.

The wireless device 10 may comprise a transmitting module 1003, e.g. a transmitter or a transceiver. The wireless device 10, the processing circuitry 1001, and/or transmitter and/or the transmitting module 1003 is configured to apply the second shift in frequency to uplink transmissions, wherein the second shift defines the shift in frequency to the subcarrier relative to the subcarrier grid of the second wireless communication network or the shift in frequency to the subcarrier grid of the second wireless communication network. E.g. in case FDD is used in the second wireless communication network, the wireless device 10, the processing circuitry 1001, and/or transmitter and/or the transmitting module 1003 is configured to apply the second shift to a subcarrier relative to the subcarrier grid for UL transmissions, or to apply the second shift to the subcarrier grid for UL transmissions for the second wireless communication network. In some embodiments, the wireless device 10, the processing circuitry 1001, and/or the transmitting module 1003 may be configured to, in case TDD is used in the second wireless communication network, omit applying the second shift. The second shift may correspond to the first shift used by the first wireless communication network.

The wireless device 10 further comprises a memory 1005. The memory comprises one or more units to be used to store data on, such as shifts, subcarrier grids, scheduling information, duplex information, indices, applications to perform the methods disclosed herein when being executed, and similar. The wireless device 10 may comprise a communication interface 1008 such as a transmitter, a receiver, a transceiver and/or one or more antennas.

The methods according to the embodiments described herein for the wireless device 10 are respectively implemented by means of e.g. a computer program 1006 or a computer program product, comprising instructions, i.e., software code portions, which, when executed on at least one processor, cause the at least one processor to carry out the actions described herein, as performed by the wireless device 10. The computer program 1006 may be stored on a computer-readable storage medium 1007, e.g. a disc, USB stick, memory or similar. The computer-readable storage medium 1007, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium or a transitory computer-readable storage medium. Thus, the wireless device 10 may comprise the processing circuitry and the memory, said memory comprising instructions executable by said processing circuitry whereby said wireless device is operative to perform the methods herein.

It should be noted that in a general scenario the term "radio network node" may be substituted with "transmission and reception point". One may make a distinction between the transmission reception points (TRPs), typically based on RSs or different synchronization signals and BRSs transmitted. Several TRPs may be logically connected to the same radio network node but if they are geographically separated, or are pointing in different propagation directions, the TRPs will be subject to the same issues as different radio network nodes. In sections herein, the terms "radio network node" and "TRP" can be thought of as interchangeable.

It should further be noted that a wireless communication network may be virtually network sliced into a number of Network/RAN slices, each Network/RAN slice supports one or more type of wireless devices and/or one or more type of services i.e. each network slice supports a different set of functionalities. Network slicing introduces the possibility that the network/RAN slices are used for different services and use cases and these services and use cases may introduce differences in the functionality supported in the different network slices. Each network/RAN slice may comprise one or more network nodes or elements of network nodes providing the services/functionalities for the respective network slice. Each network/RAN slice may comprise a network node such as a RAN node and/or a core network node.

In the LTE uplink, there is a half-tone shift of sub-carriers. Current agreement is that such a half-tone-shift will not be used in the NR uplink. In the case of LTE and NR coexisting on the same carrier frequency, the uplink sub-carriers of the two RATs will therefore be dis-aligned relative to each other, leading to inter-sub-carrier interference.

There are different alternatives how to handle this issue

Alternative #1: Do Nothing

One alternative is to keep the current agreement, i.e. there is no half-tone shift in the NR uplink. The inter-sub-carrier interference between NR and LTE uplink transmissions on the same carrier can be reduced to an acceptable level by means of the joint scheduler providing sufficient (intra-carrier) guardband between the two RATs. Note that such scheduler-provided guardbands are anyway needed in case of LTE/NR coexistence with NR operating with a non-15-kHz numerology Alternative #2: Introduce Half-Tone Shift for NR Uplink The second alternative is to change the current agreement, i.e. introducing a half-tone shift also for the NR uplink. There are different ways by which this can be done.

In general use half-tone shift for the NR uplink

Have a general possibility to configure a half-tone shift for the NR uplink, as a complement to "normal" non-half-tone shifted uplink transmission Use, or have the possibility configure a half-tone-shift for the NR uplink only for frequency bands for which coexistence with LTE may be relevant or even likely We believe that a general half-tone shift for the NR uplink is not attractive as this may negatively impact link performance. It should also be pointed out that a half-tone-shift for other numerologies than 15 kHz would provide no benefits what-so-ever.

At the same time, a complementary half-tone shift although potentially providing some benefits in an NR/LTE coexistence scenario, would increase device complexity.

Alternative #3: Adjust Uplink Carrier Frequency by 7.5 kHz Offset.

A third alternative is to, instead of a general half-tone shift, introduce the possibility to shift the entire uplink carrier by 7.5 kHz. This could simply be seen as a flexible duplex separation with no impact on the RAN1 specifications. Such flexible duplex is, specification wise, already today supported by the specification supporting the configuration of an offset to the uplink carrier frequency. For LTE the granularity of this configuration is in steps of 100 kHz, i.e. significantly larger than the required 7.5 kHz. However, for NB-IoT, the granularity is 2.5 kHz, i.e. inline with the required 7.5 kHz.

Among the above 3 alternatives discussed above, alternative #1 is clearly the most straightforward implying no change of already made agreements. If that is found not to be sufficient, alternative #3, i.e. introducing a possibility for a 7.5 kHz shift of the uplink carrier should be considered as a complement. This alternative would have no impact on the RAN #1 specifications in which the carrier frequencies are not visible. It would have an impact on the RAN4 specs and, to some extent, the RAN2 RRC specs (signaling of the uplink carrier offset).

Examples herein disclose:

A method performed by a wireless device for handling communication for the wireless device in a second wireless communication network. The second communication network may coexist with a first wireless communication network within or over a same bandwidth. The wireless device applies a second shift in frequency to uplink transmissions in case the second wireless communication network uses Frequency Division Duplex (FDD). The wireless device may omit applying the second shift in frequency to uplink transmissions in case the second wireless communication network uses Time Division Duplex (TDD). The second shift defines a shift in frequency to a subcarrier relative to a subcarrier grid of the second wireless communication network or a shift in frequency to the subcarrier grid of the second wireless communication network. The second shift may correspond to a first shift used by the first wireless communication network.

A method performed by a second radio network node or a radio network node for enabling communication for a wireless device in a second wireless communication network. The second communication network may coexist with a first wireless communication network within or over a same bandwidth. The second radio network node configures the wireless device with an indication indicating or ordering the wireless device to apply a second shift in frequency to uplink transmissions in case the second wireless communication network uses FDD. The indication may further indicate to or order the wireless device to omit applying the second shift in frequency to uplink transmissions in case the second wireless communication network uses TDD. The second shift defines a shift in frequency to a subcarrier relative to a subcarrier grid of the second wireless communication network, or a shift in frequency to the subcarrier grid of the second wireless communication network. The second shift may correspond to a first shift used by the first wireless communication network. The second radio network node may further determine whether the second wireless communication network uses FDD (or TDD).

Furthermore, a wireless device, and a second radio network node configured to perform the methods herein are also disclosed.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another wireless device in a cellular or mobile communication system. Examples of wireless devices are target device, device-to-device (D2D) UE, proximity capable wireless device (aka ProSe UE), machine type wireless device or wireless device capable of machine to machine (M2M) communication, PDA, PAD, Tablet, mobile terminals, smart phone, laptop embedded equipment (LEE), laptop mounted equipment (LME), USB dongles etc.

The embodiments are described for 5G. However the embodiments are applicable to any RAT or multi-RAT systems, where the wireless device receives and/or transmit signals (e.g. data) e.g. LTE, LTE FDD/TDD, WCDMA/HSPA, GSM/GERAN, Wi Fi, WLAN, CDMA2000 etc.

Antenna node is a unit capable of producing one or more beams covering a specific service area or direction. An antenna node can be a base station, or a part of a base station.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling communication for the wireless device in a second wireless communication network, wherein the second wireless communication network coexists with a first wireless communication network on a same bandwidth in frequency, wherein the first wireless communication network applies a first shift in frequency in uplink transmissions, wherein the method comprises: receiving from a radio network node, an indication indicating application of a second shift in frequency to uplink transmissions in case the second wireless communication network uses Frequency Division Duplex, FDD; and applying the second shift in frequency to uplink transmissions, wherein the second shift defines a shift in frequency to a subcarrier relative to a subcarrier grid of the second wireless communication network or a shift in frequency to the subcarrier grid of the second wireless communication network.

2. The method according to claim 1, wherein applying the second shift in frequency to uplink transmissions is omitted in case the second wireless communication network uses Time Division Duplex, TDD.

3. The method according to claim 1, wherein applying the second shift in frequency to uplink transmissions comprises applying the second shift in frequency to uplink transmissions only in case the second wireless communication network uses FDD.

4. The method according to claim 1, wherein the second shift corresponds to the first shift used by the first wireless communication network.

5. The method according to claim 1, wherein the indication indicates to omit applying the second shift to uplink transmissions.

6. A method performed by a radio network node for enabling communication for a wireless device in a second wireless communication network, wherein the second wireless communication network coexists with a first wireless communication network on a same bandwidth in frequency, wherein the first wireless communication network applies a first shift in frequency for uplink transmissions, wherein the method comprises: transmitting to the wireless device, an indication indicating application of a second shift in frequency to uplink transmissions in case the second wireless communication network uses frequency division duplex, FDD, wherein the second shift defines a shift in frequency to a subcarrier relative to a subcarrier grid of the second wireless communication network, or a shift in frequency to the subcarrier grid of the second wireless communication network.

7. The method according to claim 6, wherein the indication indicates to omit applying the second shift to uplink transmissions.

8. The method according to claim 6, wherein the second shift corresponds to the first shift used by the first wireless communication network.

9. The method according to claim 6, further comprising determining whether the second wireless communication network uses frequency divisional duplex, FDD, or time division duplex, TDD.

10. The method according to claim 9, wherein the indication is transmitted when it is determined that FDD is used and no indication is transmitted when it is determined that TDD is used.

11. The method according to claim 6, further comprising determining the second shift.

12. The method according to claim 11, wherein the second shift is determined to align the subcarrier grids for the first wireless communication network and the second wireless communication network, or align subcarriers of the second wireless communication network and the first wireless communication network.

13. A wireless device for handling communication for the wireless device in a second wireless communication network, wherein the second wireless communication network is configured to coexist with a first wireless communication network on a same bandwidth in frequency, wherein the first wireless communication network is configured to apply a first shift in frequency in uplink transmissions, and wherein the wireless device comprises processing circuitry configured to: receive from a radio network node, an indication indicating application of a second shift in frequency to uplink transmissions in case the second wireless communication network uses frequency division duplex, FDD; and to apply the second shift in frequency to uplink transmissions, wherein the second shift defines a shift in frequency to a subcarrier relative to a subcarrier grid of the second wireless communication network or a shift in frequency to the subcarrier grid of the second wireless communication network.

14. The wireless device according to claim 13, wherein the processing circuitry is configured to omit applying the second shift in frequency to uplink transmissions in case the second wireless communication network uses Time Division Duplex, TDD.

15. The wireless device according to claim 13, wherein the processing circuitry is configured to apply the second shift in frequency to uplink transmissions only in case the second wireless communication network uses FDD.

16. The wireless device according to claim 13, wherein the second shift corresponds to the first shift used by the first wireless communication network.

17. The wireless device according to claim 13, wherein the indication indicates to omit applying the second shift to uplink transmissions.

18. A radio network node for enabling communication for a wireless device in a second wireless communication network, wherein the second wireless communication network is configured to coexist with a first wireless communication network on a same bandwidth in frequency, wherein the first wireless communication network is configured to apply a first shift in frequency for uplink transmissions, and wherein the radio network node comprises processing circuitry configured to: transmit to the wireless device, an indication indicating application of a second shift in frequency to uplink transmissions in case the second wireless communication network uses frequency division duplex, FDD, wherein the second shift defines a shift in frequency to a subcarrier relative to a subcarrier grid of the second wireless communication network, or a shift in frequency to the subcarrier grid of the second wireless communication network.

19. The radio network node according to claim 18, wherein the indication indicates to omit applying the second shift to uplink transmissions.

20. The radio network node according to claim 18, wherein the second shift corresponds to the first shift used by the first wireless communication network.

21. The radio network node according to claim 18, wherein the processing circuitry is further configured to determine whether the second wireless communication network uses frequency divisional duplex, FDD, or time division duplex, TDD.

22. The radio network node according to claim 21, wherein the processing circuitry is configured to transmit the indication when determined that FDD is used, and to transmit no indication when determined that TDD is used.

23. The radio network node according to claim 18, wherein the processing circuitry is configured to determine the second shift.

24. The radio network node according to claim 23, wherein the second shift is determined to align the subcarrier grids for the first wireless communication network and the second wireless communication network, or align subcarriers of the second wireless communication network and the first wireless communication network.

25. A non-transitory computer-readable storage medium, having stored thereon a computer program comprising instructions which, when executed on at least one processor, cause the at least one processor to handle communication for a wireless device in a second wireless communication network, wherein the second wireless communication network coexists with a first wireless communication network on a same bandwidth in frequency, wherein the first wireless communication network applies a first shift in frequency in uplink transmissions, wherein the instructions cause the at least one processor to: receive from a radio network node, an indication indicating application of a second shift in frequency to uplink transmissions in case the second wireless communication network uses Frequency Division Duplex, FDD; and apply the second shift in frequency to uplink transmissions, wherein the second shift defines a shift in frequency to a subcarrier relative to a subcarrier grid of the second wireless communication network or a shift in frequency to the subcarrier grid of the second wireless communication network.

* * * * *